(12) United States Patent
Ross (10) Patent No.: US 9,084,919 B2
(45) Date of Patent: Jul. 21, 2015

(54) STABILITY BALL RAPID INFLATION SYSTEM

(71) Applicant: Exemplar Design, LLC, Mason, OH (US)

(72) Inventor: Adam L. Ross, Mason, OH (US)

(73) Assignee: Exemplar Design, LLC, Mason, OH (US)

( * ) Notice: Subject to any disclaimer, the term of this patent is extended or adjusted under 35 U.S.C. 154(b) by 183 days.

(21) Appl. No.: 13/783,873

(22) Filed: Mar. 4, 2013

(65) Prior Publication Data

US 2013/0231229 A1     Sep. 5, 2013

Related U.S. Application Data

(60) Provisional application No. 61/606,585, filed on Mar. 5, 2012.

(51) Int. Cl.
*F16K 15/20*      (2006.01)
*A63B 41/12*     (2006.01)
*A63B 26/00*     (2006.01)

(52) U.S. Cl.
CPC .............. *A63B 41/12* (2013.01); *A63B 26/003* (2013.01); *F16K 15/20* (2013.01)

(58) Field of Classification Search
CPC ...... A63B 26/003; A63B 41/12; A63B 41/00; F16K 15/20
USPC .............. 137/223, 232, 233, 231, 234.5, 234; 473/610, 611; 285/139.1, 143.1, 200, 285/219, 220, 192
See application file for complete search history.

(56) References Cited

U.S. PATENT DOCUMENTS

| | | | | | |
|---|---|---|---|---|---|
| 1,425,545 | A | * | 8/1922 | Royer | 152/427 |
| 2,103,822 | A | * | 12/1937 | Perry | 137/223 |
| 2,357,754 | A | * | 9/1944 | Moll | 220/3.2 |
| 4,766,628 | A | * | 8/1988 | Walker | 5/706 |
| 5,746,243 | A | * | 5/1998 | Franke | 137/231 |
| 6,196,254 | B1 | * | 3/2001 | Shaw | 137/231 |
| 6,267,161 | B1 | * | 7/2001 | Barbieri | 141/383 |
| 7,497,416 | B2 | * | 3/2009 | Wang | 251/349 |
| 2006/0063653 | A1 | * | 3/2006 | Wickens et al. | 482/142 |

OTHER PUBLICATIONS

Perfect Core Ball, 65 cm, advertised by Walmart—http://www.walmart.com/ip/20461385?wmlspartner=wlpa& adid=22222222227015543692 . . . [Date retrieved—Sep. 17, 2013].
Spalding Infusion Drive Basketball advertised by Big 5 Sporting Goods—http://www.big5sportinggoods.com/product/basketballs/478242-152144/infusion-drive-basketball.html [Date retrieved—Sep. 17, 2013].

* cited by examiner

*Primary Examiner* — Kevin Murphy
*Assistant Examiner* — Josephine Trinidad-Borges
(74) *Attorney, Agent, or Firm* — Baker & Hostetler LLP (57) ABSTRACT

A stability ball inflation and deflation system includes a stability ball with a bore, and a plug within the bore walls. An air-control module engaged within the axial channel of the plug selectively allows air to pass in one or both directions. The air-control module includes a one-way air valve, and a cap releasably sealable to the plug. An airway extending from the one-way valve provides fluid communication with the interior of the stability ball. An inflator adapted to engage the one-way air valve may be removably coupled to the air valve, and provide air passages to direct air from a pressurized air cartridge into the stability ball.

14 Claims, 7 Drawing Sheets

STABILITY BALL RAPID INFLATION SYSTEM

CROSS-REFERENCE TO RELATED APPLICATIONS

This application claims the benefit of U.S. Provisional Application No. 61/606,585, filed Mar. 5, 2012, which is hereby incorporated by reference.

BACKGROUND

The present disclosure generally pertains to sports fitness systems and, more particularly, to stability ball inflation and deflation systems. Stability balls may be used in physical therapy, exercise, general fitness, and sports medicine.

Most stability balls include a small and simple plastic plug that keeps air within the ball when the stability ball is in use. These balls come with a hand pump to fill the ball up with air. It is difficult and time-consuming to fill the ball with air by way of a hand pump. In addition, in order to plug the ball up properly, the pump must be removed from the hole in the stability ball, and the plug must be quickly inserted in the hole before a significant volume of air can escape from the ball.

Some stability balls contain weights within the ball, such as sand, fill or weight slugs to resist the ball from rolling. For example, one stability ball has a weighted slug in a screw cap that screws into a hole on the surface of the ball. This hole is wider so it allows the ball to deflate quicker than the stability balls with a small plastic plug. However, it still has the same issue of inflating quickly and covering the hole in the stability ball before any air can escape.

SUMMARY

Stability ball inflation and deflation systems are generally disclosed. Some example embodiments may include methods, apparatus, and/or systems pertaining to inflation and deflation, rapid inflation, stability balls, and exercise devices.

The stability ball inflation system of the disclosure includes a stability ball with a bore, the bore walls extending radially into the interior of the ball. A generally cylindrical or conical plug lies within the bore walls and includes an axial channel extending therethrough providing fluid communication between the interior of the ball and the ambient.

An air-control module coupled to the plug within the axial channel of the plug provides an air-tight seal when threaded completely to the plug (a first position), and may selectively allow air to pass in one or both directions when not threaded completely to the plug (a second position). The air-control module includes an airway extending therethrough providing fluid communication between the interior of the ball and the ambient, and a one-way air valve positioned in the airway to selectively allow air into the stability ball via an inflator component.

Two diametrically opposed tabs may extend axially outwardly from the outer surface of the air-control module to provide grips to manually rotate the module between first position and a second position.

An inflator may engage to the air valve, and includes passages to direct airflow from a pressurized air cartridge into the ball. The inflator may include a flow controller, wherein the flow controller adjusts the airflow volume passing to the valve.

In a first exemplary aspect of the disclosure, a stability ball inflation and deflation system is provided that includes: a stability ball, including a bore extending radially into the interior of the ball; an open-ended plug within the bore, with a proximal end aligned towards the surface of the ball, and a distal end extending into the interior of the ball, wherein the plug includes an axial channel extending therethrough; an air-control module, engaged within the axial channel of the plug and including a one-way air valve and a cap releasably sealable to the plug, wherein the air-control module includes an airway extending from the one-way valve axially therethrough and providing fluid communication with the interior of the stability ball; and an inflator adapted to engage the one-way air valve, wherein the inflator includes air passages to direct an airflow from a pressurized air cartridge.

In a more detailed embodiment, the air-control module is configured to be manipulated between a first position in which the cap forms an air-tight seal with the proximal end of the plug, and a second position in which the air-tight seal is broken and fluid communication between the interior of the ball and the ambient is provided through the plug and air-control module.

In a more detailed embodiment, the air-control module is threadingly engaged with the plug, and is repositionable between the first and second positions by inward and outward threading of the air-control module with respect to the plug. Fluid communication between the interior of the ball and the ambient in the second position is provided by a groove extending axially through threads that engage the air-control module and plug. In other embodiments, the groove is provided in the threads of the air-control module.

In a more detailed embodiment, the air-tight seal is provided by an o-ring mounted to at least one of the plug and the air-control module.

In a more detailed embodiment, two rigid and diametrically opposed tabs extend axially outward from the outer surface of the cap.

In a more detailed embodiment, the plug and air-control module, including the tabs, are completely recessed with respect to the outer surface of the ball at least when the air-control module is in the first position.

In a more detailed embodiment, a retainer maintains a connection between the air-control module and the plug. The retainer includes a stem on the air-control module, extends through a narrow portion of the axial channel of the plug, and includes a stopper at the end of the stem positioned axially inward of the narrow portion of the axial channel of the plug, the stopper having a greater diameter than the narrow portion of the axial channel of the plug.

In a more detailed embodiment, the inflator includes a valve coupling, wherein the valve coupling engages the one-way air valve to allow airflow into the ball. The inflator includes a flow controller, wherein the flow controller adjusts the airflow volume passing to the valve. The inflator includes a cartridge receiver to connect to a pressurized air cartridge.

In a more detailed embodiment, the pressurized air cartridge is a $CO_2$ cartridge.

BRIEF DESCRIPTION OF THE DRAWINGS

The foregoing and other features of the present disclosure will become more fully apparent from the following description and appended claims to the stability ball inflation system, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 (a) is a view of the portion of the inflation mechanism installed in the stability ball.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Figure 1:
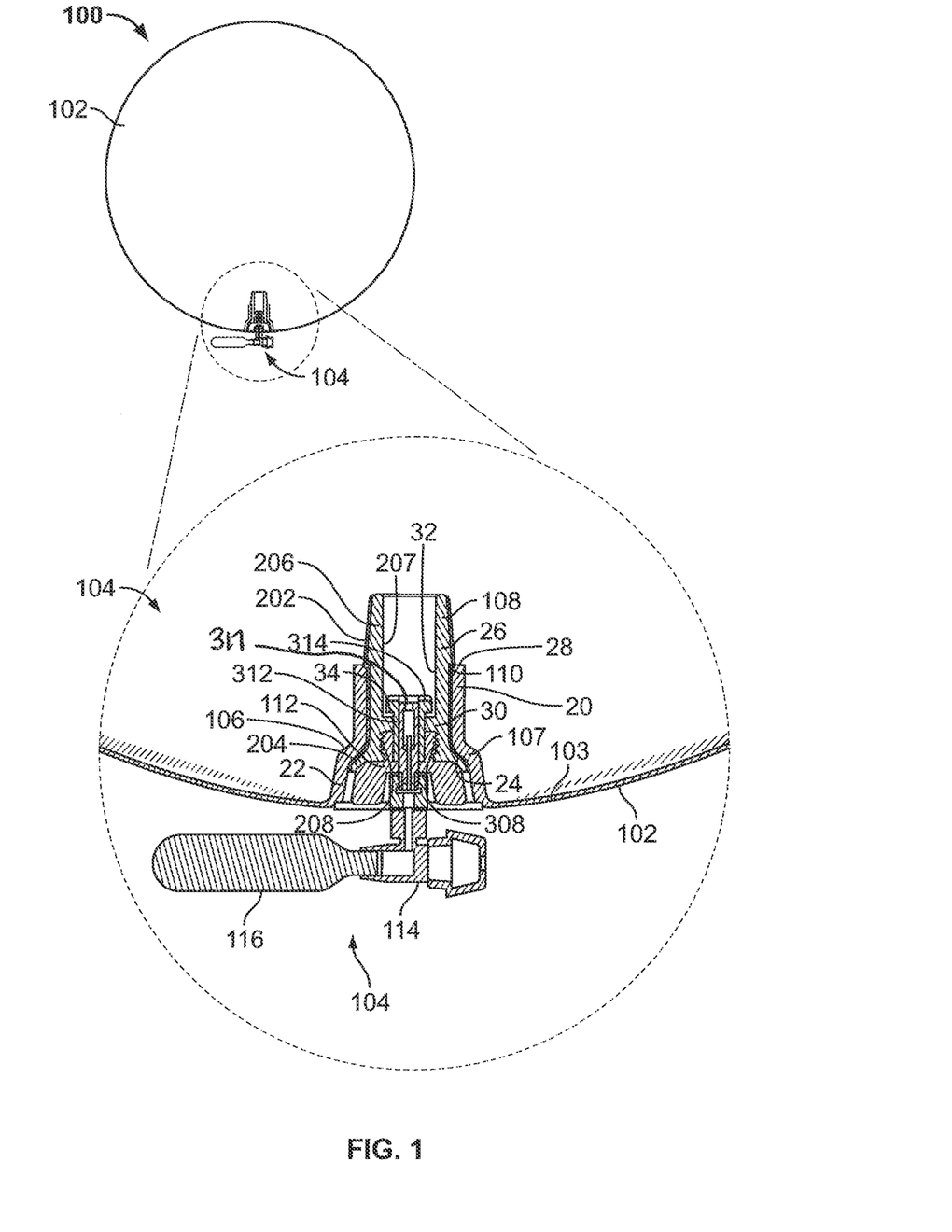
FIG. 1 is a cross sectional view of an exemplary stability ball inflation and deflation system according to the disclosure, including a detail view of the inflation mechanism.

FIG. 1 is a cross-sectional view of an exemplary stability ball inflation and deflation system 100 according to the disclosure, including an inflation mechanism 104 and a stability ball 102. As seen in the detail view, stability ball 102 includes a bore 106 extending radially into the ball 102. The bore 106 is defined by generally cylindrical walls 107 extending radially inward from the generally spherical walls 103 of the ball 102. The radially innermost portion 20 of the bore 106 has a narrower diameter as compared to the radially outermost portion 22 of the bore, which widens with the distance from a circumferential shoulder 24 transitioning the innermost portion 20 to the outermost portion 22. A plug 108 is held within the bore 106 by a circumferential shoulder 110 (at an axially outward edge of a radially outwardly tapered leading portion 26 of the plug), which abuts against the radially inward end wall 28 of the generally cylindrical walls 107 of the bore 106, thereby maintaining the plug 108 in place after the radially leading portion 26 of the plug 108 is pushed by the radially inward end wall 28. Bore 106 walls may follow the contours of plug 108 to provide additional stabilization of plug 108 to ball 102, and may include an axially inward circumferential, and radially outwardly extending flange 204 that abuts against the shoulder 24 of the bore 106. As shown in FIG. 1, in an embodiment, the plug is recessed within the outermost portion 22 of the bore 106. As will be described below, an air-control module 112 couples with plug 106 to form an airtight seal, and an inflator 114 engages air-control module 112 to channel pressurized air from cartridge 116 to ball 102.

Figure 2:
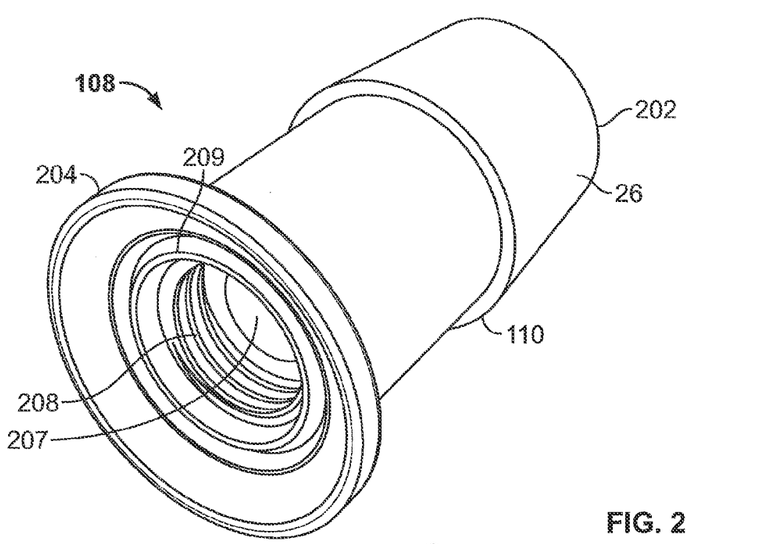
FIG. 2 is a perspective view of an exemplary plug.

FIG. 2 is a perspective view of plug 108. Plug 108 is open at both ends: the distal end, extending into the interior of ball 102, and the proximal end, located towards the surface of ball 102. In an exemplary embodiment, plug 108 may include a plastic plug cover 202 fitted over a metal core 206, where the metal core 206 includes an axial channel 207 extending therethrough. The core 206 may include an inwardly threaded circumferential wall 208 at the axially outermost portion of the axial channel 207 for threadedly engaging with the air-control module 112, as described below. The plug 108 and may further include an O-ring 209 at the axially outer end of the channel 207 and surrounding the channel 207, providing a fluidic (air-tight) seal with air-control module 112. The axial channel 207 may further include a narrow portion 30 positioned axially between the threaded portion 208 and a wider portion 32. An axially inwardly facing shoulder 34 transitions the narrow portion 30 to the wider portion 32 of the channel.

Figure 3:
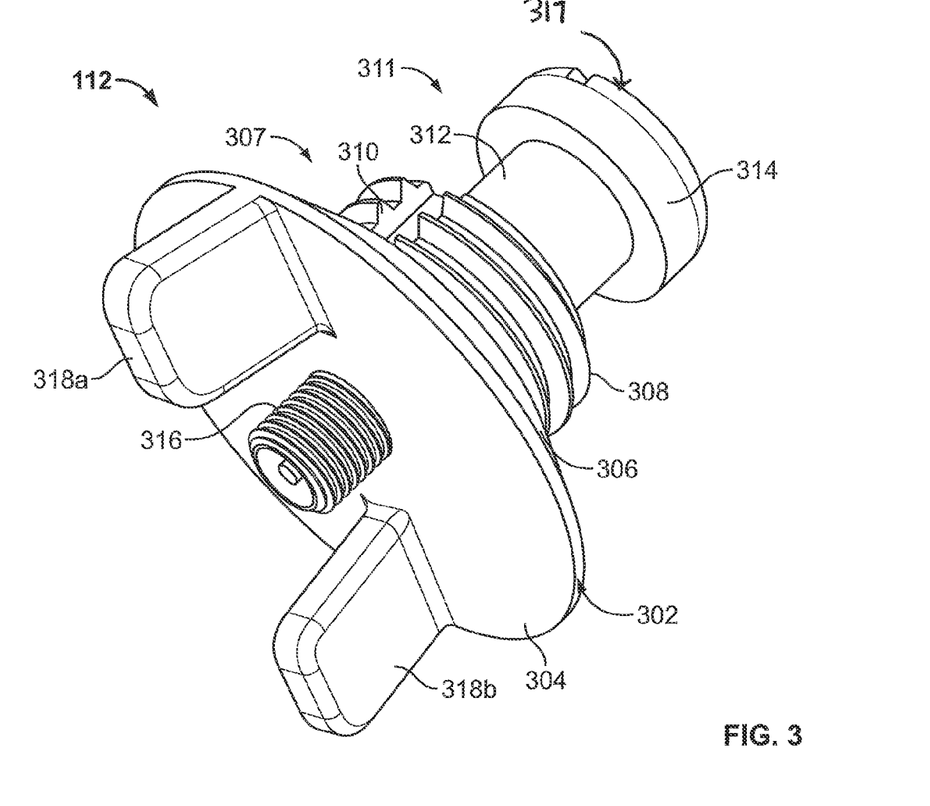
FIG. 3 is a perspective view of an exemplary air-control module.

FIG. 3 is a perspective view of the air-control module 112. Air-control module 112 seals air within stability ball 102, as well as controls air flowing in and out stability ball 102. Air-control module 112 may include a cap 302 with a disc-shaped axially outer surface 304 and a frustoconical portion 306 extending axially out from an outwardly threaded section 308, adapted to threadedly engage the threaded section 208 of the plug. Cap 302 is adapted to engage the O-ring 209 so as to form an airtight seal with plug 108 when the air-control module 112 is threaded into the plug 108. Cap top 306 may further include a rubber covering or an O-ring to ensure an airtight seal. A shunt 307 may extend from axially inward from cap 302. In an exemplary embodiment, shunt 307 is a threaded cylinder 308 including at least one air flow groove 310 extending axially through the outer threads. Threaded cylinder 308 mates with threaded portion 208 of plug 108, and allows the cap 302 to lower and raise relative to plug 108 for sealing air, or for rapid deflation of ball 102. Cap 302 lower and raises relative to plug 108 as the module 112 is threaded in an out of the plug 108, and may be designed to not fully disconnect from the plug 108. By raising cap 302 relative to plug 108, thereby releasing the seal between the cap 302 and the plug 108, air is released from stability ball 102 via flow groove 310. Rigid tabs 318 (a) and 318 (b) may extend axially outward from outer surface 304 to provide grips to rotate cap 302 between a first position in which the cap 302 is sealingly engaged with plug 108 and a second position in which the seal is broken and air may flow through channel 310. It should be understood that the groove 310 may be also or alternatively be provided in the threads in the plug.

The air-control module 112 includes a stem 312 extending axially inward from the threaded cylinder 308 and includes a diametrically wider stopper 314 at the innermost axial end to provide a cap retainer 311 that maintains a connection between air-control module 112 and plug 108, and may resist complete separation of threaded cylinder 308 mates from threaded portion 208 of plug 108. Referring back to FIG. 1, the stem 312 extends through the narrow portion 30 of the axial channel 207 within the plug 108, and the wider stopper 314 (which may be threadedly attached to stem 312 after stem is inserted through the narrow portion) abuts the shoulder 34 of the narrow portion 30 of the axial channel to thereby maintain the air-control module 312 within the plug 108.

The air-control module 112 includes an airway extending axially therethrough from an outer one-way air valve 316 of conventional design (similar to that of a standard tire stem, for example), which protrudes from the outer surface 304, to an axially inner opening 317 that provides fluid communication with the interior of the ball 102 (via the channel 207 in the plug). the one-way air valve 316 prevents air from entering or exiting stability ball 102 in the absence of a valve coupler. The valve 316 may also include an outwardly threaded cylindrical surface for connection with an inflator component 114.

Figure 4:
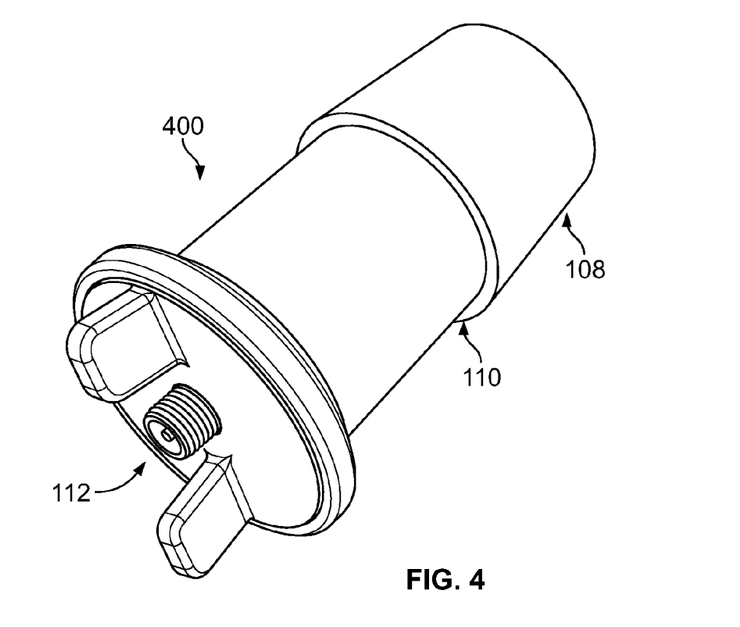
FIG. 4 is perspective view of the coupled plug and air-control module.
Figure 5A:
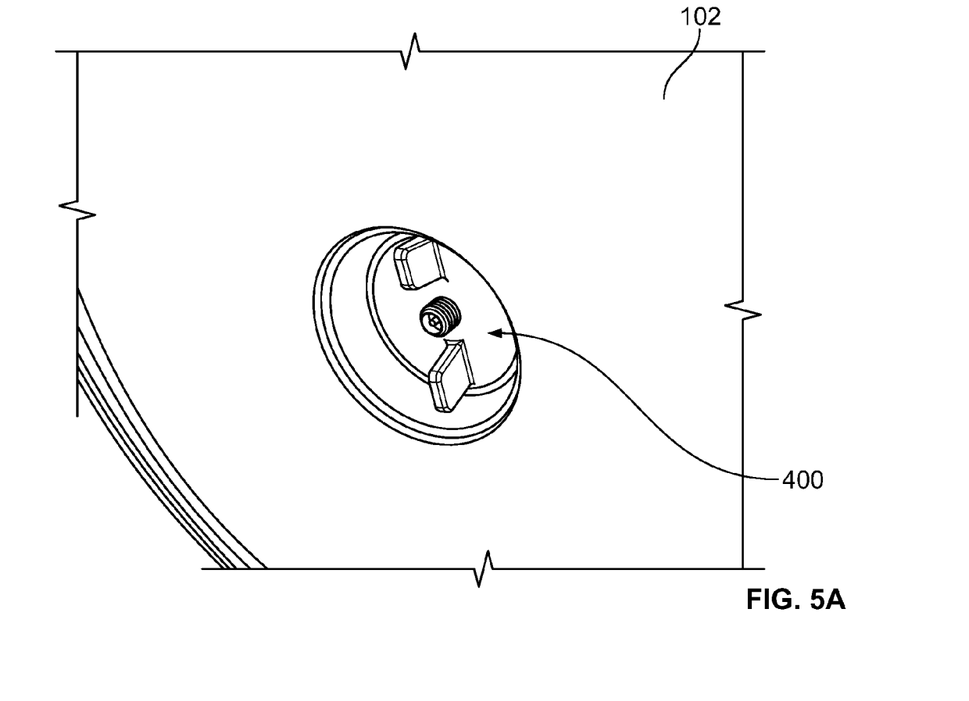
Figure 5B:
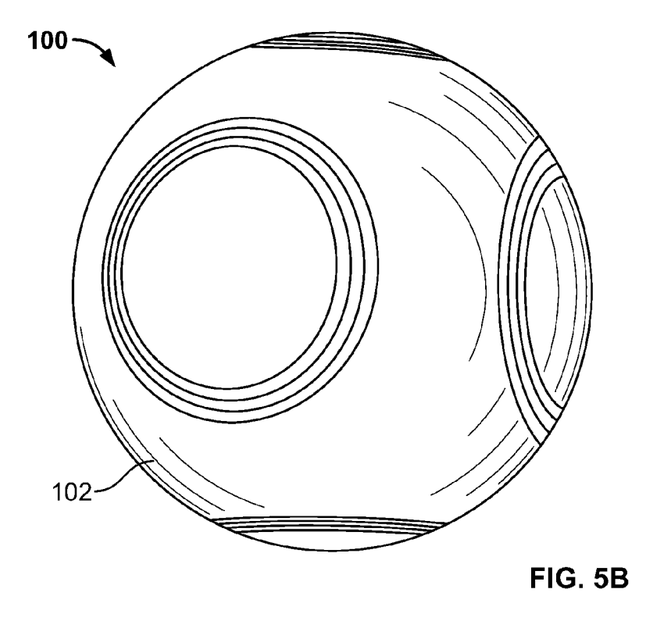
FIG. 5(b) is a perspective view of the stability ball in an inflated state.

FIG. 4 is a perspective view of air-control module 112 coupled to plug 108, and may be referred to collectively as an air-transfer station 400. The air-transfer station 400 of the inflation mechanism 104 remains in the stability ball 102 during use, inflation, and deflation. Thus, as shown in FIG. 5(*a*), air-transfer station 400 may be flush with, or slightly set into, the surface of ball 102, to avoid interfering with the movement of the stability ball 102. As shown in FIG. 5(*b*), even when the air-transfer station 400 is in the stability ball 102, the ball 102 is free to roll in any direction dictated by the particular stability ball's shape. In FIG. 5(*b*), stability ball 102 is spherical, but in a further embodiment, the stability ball 102 may be oval.

Figure 6:
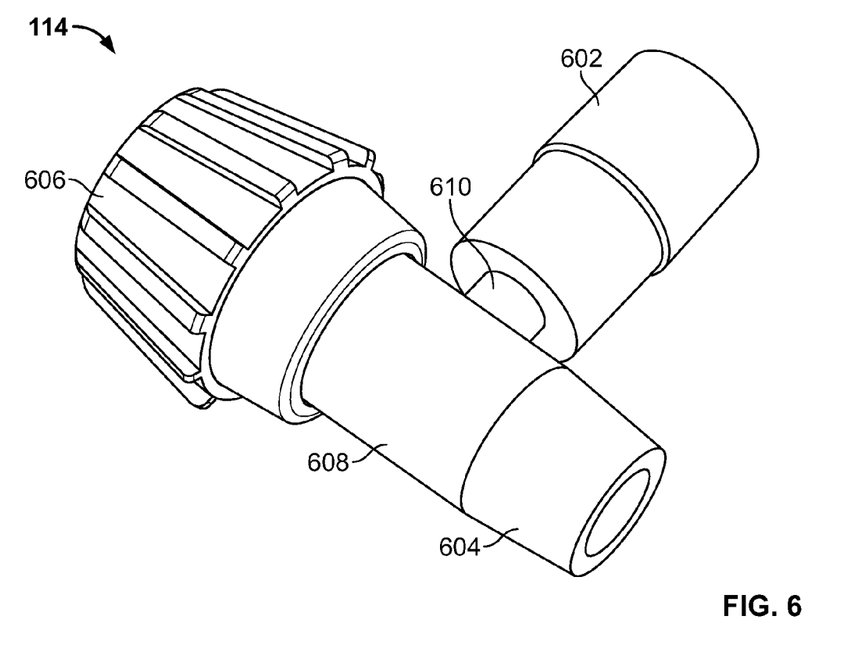
FIG. 6 is a perspective view of an exemplary air inflator.
Figure 7:
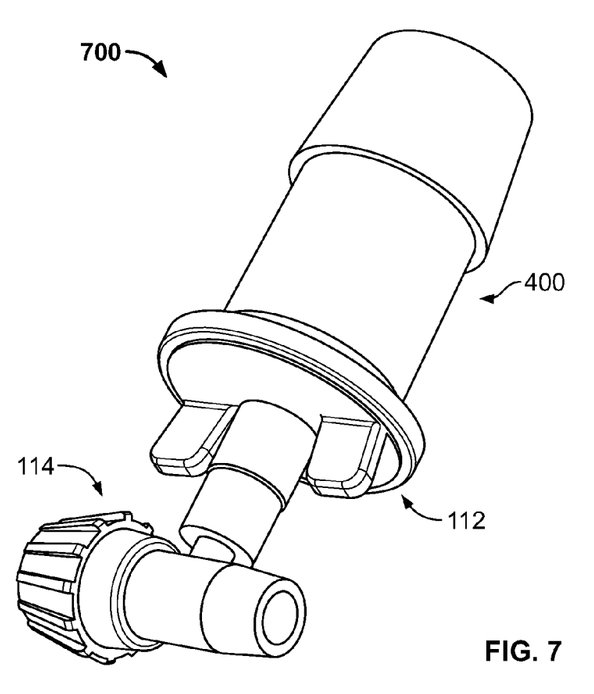
FIG. 7 is a perspective view of the air inflator coupled to the air-control module.

FIG. 6 is a perspective view of the inflator 114, including a valve coupler 602, for attaching to and engaging valve 316, and an air cartridge receiver 604, for attaching a pressurized air cartridge. Inflator 114 may include a generally T-shaped tube 608 or channel for directing air flow. A flow volume controller 606, such as a knob coupled to constrictor 610 within tube 608, adjusts the rate of air flow through valve 316 into ball 102. In a completely shut position, flow controller 606 closes the system 100 and prevents air from entering, or exiting, stability ball 102. FIG. 7 shows the air inflator 114 attached to air-transfer station 400, via valve coupler 602 and valve 316.

Figure 8:
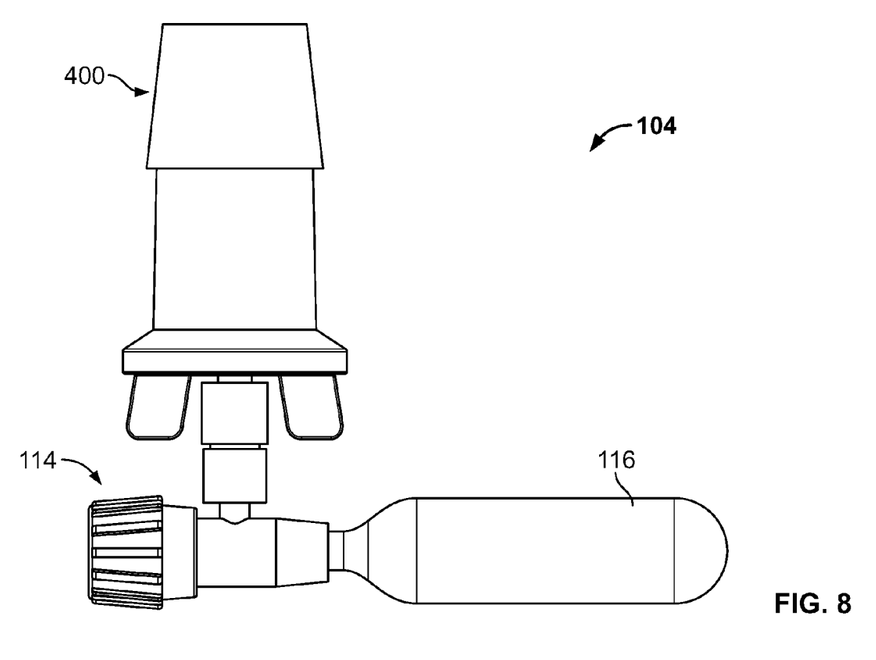
FIG. 8 is a perspective view of an exemplary inflation mechanism.

FIG. 8 is a perspective view the inflation mechanism 104. Pressurized air cartridge 116 is fitted to the air cartridge receiver 604 on inflator 114. The receiver 604 may engage the cartridge 116 by threading or by friction. The pressurized air cartridge may be a disposable $CO_2$ cartridge.

Figure 9A:
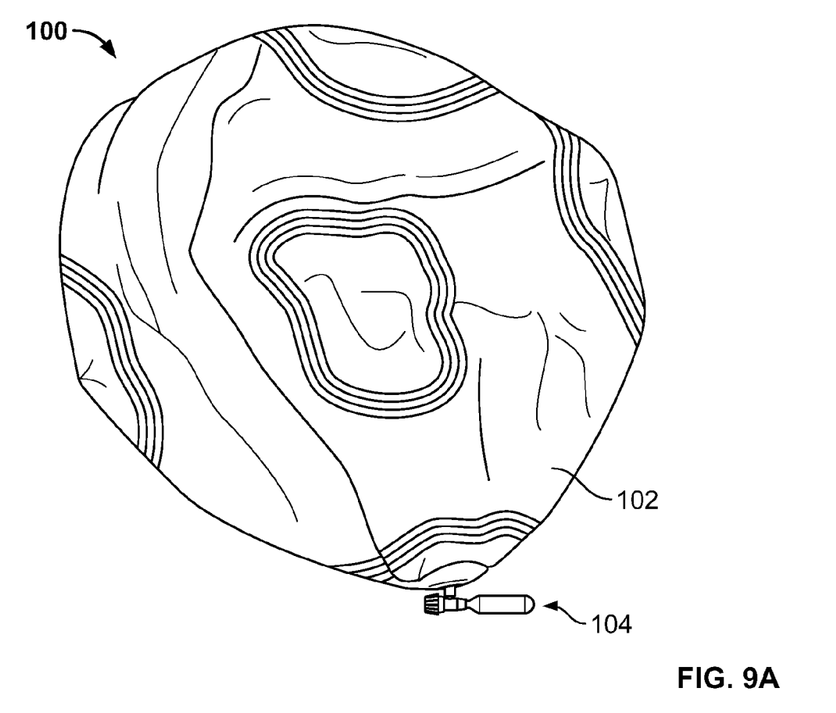
FIG. 9(a) and FIG. 9(b) are perspective views of the stability ball inflation system with the stability ball in a deflated state.
Figure 9B:
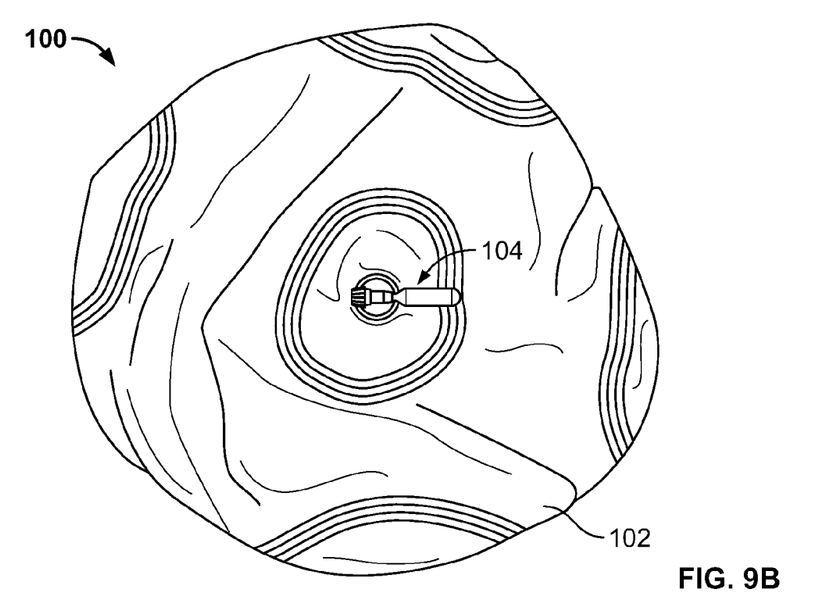
Figure 10A:
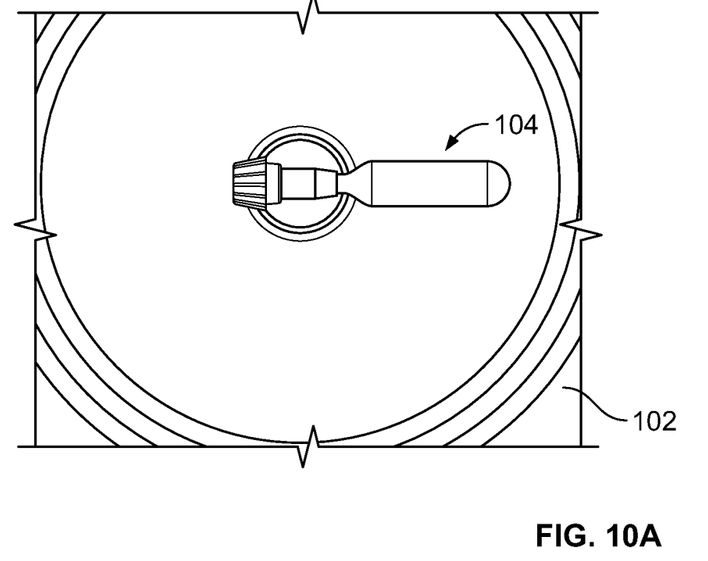
FIG. 10(a) is a view of the inflator attached to the stability ball.
Figure 10B:
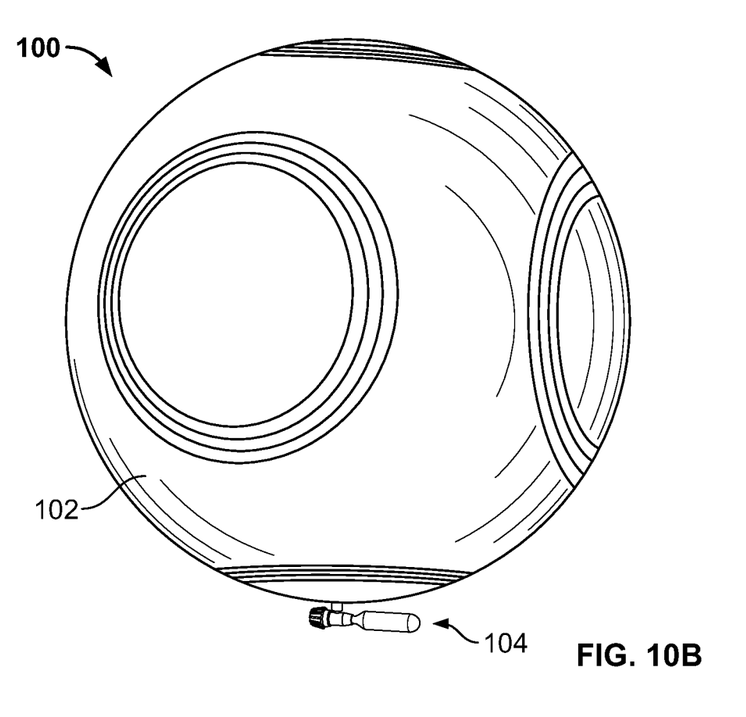
FIG. 10(b) is a perspective view of stability ball inflation and deflation system.

FIG. 9 and FIG. 10 show a perspective view of the stability ball inflation and deflation system 100. Inflation mechanism 104 is attached to stability ball 102. In FIG. 9(*a*) and FIG. 9(*b*), stability ball 102 is in a deflated state. FIG. 10(*a*) is a close up of the inflation mechanism 104 attached to the stability ball 102. In FIG. 10(*b*), stability ball 102 is shown in an inflated state.

A deflated stability ball 102 as shown in FIG. 9 may be inflated to the stability ball of FIG. 10(*b*) with the following steps. First, cap 302 of the air-control module 112 is sealed to plug 108 as shown in FIG. 4 and FIG. 5(*a*) by rotating tabs 318 (*a*) and 318 (*b*) in a first direction, causing threaded cylinder 308 to turn on plug 108. Next, inflator 114 is coupled to valve 316 with the valve coupler 602. A $CO_2$ cartridge 116 is attached to inflator 114, and air is allowed to flow from the pressurized air cartridge 116 to the ball 102 by turning the knob 606 to an open position. When the ball 102 is inflated, as shown in FIG. 10, the inflator 114 may be removed, and air is automatically sealed within ball 102 with minimal leakage. To deflate ball 102 tabs 318 (*a*) and 318 (*b*) may be rotated in a second direction to release the seal between cap 302 and plug 108, and allowing air to pass from the stability ball through air flow channels 310.

The above presents a description of exemplary embodiments contemplated for carrying out the system in the disclosure, and is not to be taken as limiting. The disclosure encompasses modifications and alternative constructions coming within the spirit and scope of the present disclosure. For example, as discussed above, the ball may be spherical, oval, or another shape. The sealing cap may be of alternate sizes and shapes, and may seal the plug with alternate mechanisms, to allow for rapid inflation and deflation. The separate pieces may be welded or molded as continuous pieces.

What is claimed is:

1. A stability ball inflation and deflation system, comprising:
    a stability ball, including a bore extending radially into the interior of the ball;
    an open-ended plug within the bore, with a proximal end aligned towards the surface of the ball, and a distal end extending into the interior of the ball, the plug including an axial channel extending therethrough;
        an air-control module, engaged within the axial channel of the plug and including a one-way air valve and a cap releasably sealable to the plug, the air-control module including an airway extending from the one-way valve axially therethrough and providing fluid communication with the interior of the stability ball;
        an inflator adapted to engage the one-way air valve, wherein the inflator includes air passages to direct an airflow from a pressurized air cartridge;
        wherein the air-control module is configured to be manipulated between a first position in which the cap forms an air-tight seal with the proximal end of the plug and a second position the air-tight seal is broken and fluid communication between the interior of the ball and the ambient is provided through the plug and air-control module;
        wherein the air-control module is threadedly engaged with the plug, and is repositionable between the first and second positions by inward and outward threading of the air-control module with respect to the plug; and
        wherein the fluid communication between the interior of the ball and the ambient in the second position is provided by a groove extending axially through threads that engage the air-control module and plug.

2. The stability ball inflation system of claim 1, wherein the groove is provided in the threads of the air-control module.

3. The stability ball inflation system of claim 1, wherein:
    the air-tight seal is provided by an o-ring mounted to at least one of the plug and the air-control module.

4. The stability ball inflation system of claim 1, further comprising:
    two rigid and diametrically opposed tabs extending axially outward from the outer surface of the cap.

5. The stability ball inflation system of claim 4, wherein:
    the plug and air-control module, including the tabs, are completely recessed with respect to the outer surface of the ball at least when the air-control module is in the first position.

6. The stability ball inflation system of claim 1, further comprising:
    a retainer maintaining a connection between the air-control module and the plug.

7. The stability ball inflation system of claim 6, wherein:
    the retainer comprises a stem on the air-control module extending through a narrow portion of the axial channel, and a stopper at the end of the stem and positioned axially inward of the narrow portion of the axial channel of the plug, the stopper having a greater diameter than the narrow portion of the axial channel of the plug.

8. The stability ball inflation system of claim 1, further comprising:
    the inflator includes a valve coupling, wherein the valve coupling engages the one-way air valve to allow airflow into the ball.

9. The stability ball inflation system of claim 1, wherein:
the inflator includes a flow controller, wherein the flow controller adjusts the airflow volume passing to the valve.

10. The stability ball inflation system of claim 9, wherein:
the inflator includes a cartridge receiver to connect to the pressurized air cartridge.

11. The stability ball inflation system of claim 10, wherein:
the pressurized air cartridge is a $CO_2$ cartridge.

12. A method for selectively inflating or deflating a stability ball, the method comprising the steps of:
providing a stability ball, the ball comprising:
an axial channel defined by a plug extending therethrough;
a cap releasably sealable to the plug;
a one-way air valve protruding from the exterior of the cap; and
an airway extending from the one-way valve axially therethrough and providing fluid communication with the interior of the stability ball;
inflating the ball by manipulating the cap to a first position to create an air-tight seal, and coupling a valve connector in fluid communication with a pressurized air cartridge to the one-way valve;
deflating the ball by manipulating the cap to a second position and breaking air-tight seal, and causing fluid communication between the interior of the ball and the ambient through the plug and cap;
wherein the step of manipulating the cap is accomplished by rotating two rigid and diametrically opposed tabs extending axially outward from the outer surface of the cap, thereby moving the cap laterally with respect to the plug, wherein the cap is threadedly engaged with the core of the plug; and
further providing grooves extending axially through threads that engage the cap and plug, allowing fluid communication between the interior of the ball and the ambient in the second position.

13. The method of claim 12, further comprising:
adjusting the air flow volume from the pressurized air cartridge to the interior of the ball by manipulating a flow controller in fluid communication with the valve connector and the pressurized air cartridge.

14. The method of claim 12, wherein:
the airway extends through a retainer maintaining a connection between the cap and the plug.

\* \* \* \* \*